April 6, 1943.  H. E. SOMES  2,315,558
METHOD OF STRENGTHENING TUBULAR METALLIC OBJECTS
Filed April 11, 1940
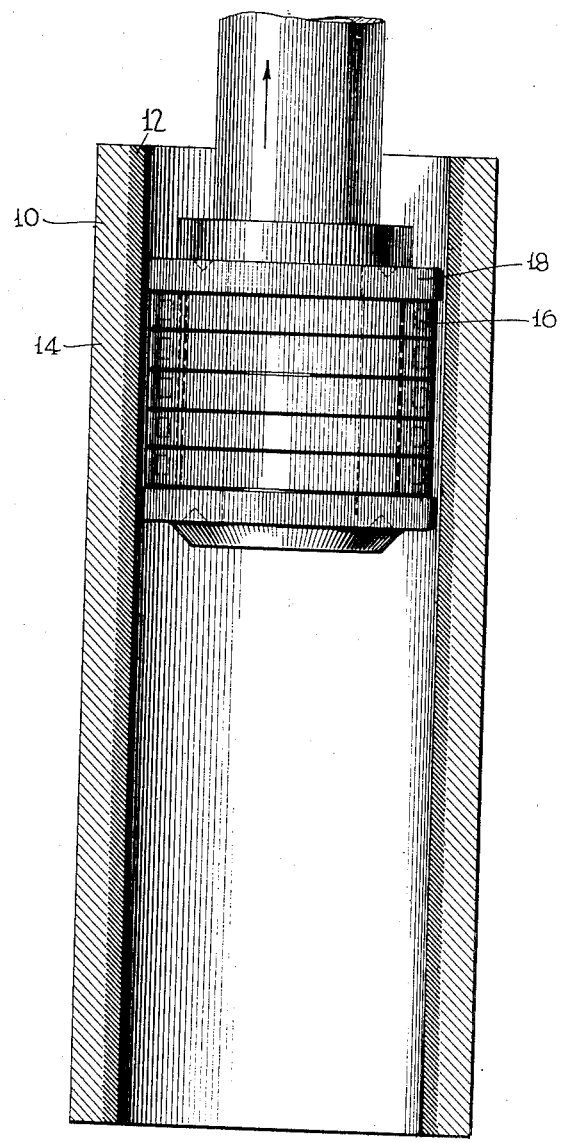
INVENTOR
Howard E. Somes
BY John P. Tarbox
ATTORNEY Patented Apr. 6, 1943

2,315,558

UNITED STATES PATENT OFFICE 2,315,558

METHOD OF STRENGTHENING TUBULAR METALLIC OBJECTS

Howard E. Somes, Detroit, Mich., assignor to Budd Induction Heating, Inc., Philadelphia, Pa., a corporation of Michigan Application April 11, 1940, Serial No. 329,053

4 Claims. (Cl. 148—13)

This invention relates to tubular structures and more particularly to tubular structures having a hardened internal layer and in which trapped stresses exist which are so arranged as to increase the strength of the tubular object against internal loading.

It has been heretofore the practice in tubular objects of homogeneous uniform strength material to increase the strength of the object against bursting pressures or internal loading by placing the internal layers under residual compression and the external layers under residual tension such that upon loading the tubular object internally to a maximum desired pressure, the residual compressive stresses will be relieved and changed to tension stresses, which tension stresses at the maximum desired internal pressure loading will be equal to the tension stresses existing in the outer layers of the material. In fact, in the most desirable condition under the maximum desired loading all the tension stresses throughout the piece would be uniform. The maximum tension stress at any point within the material to which the material may be safely carried must be a stress below the yield point of the material or else under such loading the tubular object will take a permanent set and not return to its original diameter when the load is relieved.

In tubular objects in which an internal layer of the material is hardened the yield point or yield stress to which the hardened layer may be carried exceeds the yield strength of the unhardened material and, therefore, the internal layers may, when the tubular object is under a maximum desired internal pressure, be stressed to a much higher point than the external layers and still remain within the yield point of the material.

To provide residual or trapped stresses in a tubular object having zones of non-uniform yield strength, such that the tubular object will have a maximum strength against internal loading without any of the material being stressed beyond their respective yield points during such loading is an object of the present invention.

Another object of the invention relates to the tubular structure and its characteristics which permit such maximum strength under load, and A further object of the invention relates to a simplified procedure for creating in tubular objects a system of residual or trapped stresses such that the effective internal load strength of the tube may be materially increased.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing wherein like reference numerals indicate like parts, the single figure illustrates a section through a tubular structure together with an apparatus for effecting the rearrangement of stresses therein.

In a copending application Serial No. 164,320, filed September 17, 1937, which has matured into Patent No. 2,281,331, there is disclosed a method and apparatus for hardening an internal layer of a tubular structure by generating heat in an internal layer of the structure through electromagnetically induced currents. The heat is applied to the layer to an approximate depth of a tenth of an inch and in the space of time of a few seconds and immediately quenched before the remainder of the metal behind the layer becomes heated to any appreciable degree, or before the heat of the internal layer can drift to the remaining metal in any consequential amount. It has been found that in such structures, generally, a state of trapped stresses is set up in which the hardened layer is under compression and the remaining metal under tension, that is when the tubular structure is unloaded. The hardness of the internal layer may exceed sixty on the Rockwell C scale whereas the metal in the remainder of the structure would be the same as that which existed prior to the heat treatment. It is a well-known fact that the tensile strength of a hardened layer is considerably increased by hardening and that the tensile strength or ultimate strength for such a layer of such metal is substantially the same as the yield strength. For example, the tensile strength of metal hardened to Rockwell C 60 may be as high as 311,000 pounds per square inch whereas such metal prior to the hardening might have had a tensile strength (ultimate strength) of 93,000 pounds per square inch assuming it originally had a hardness of Rockwell C 10. The ultimate strength of 93,000 pounds is considerably above the yield strength which would probably be in the order of 60,000 pounds per square inch. It will thus appear that if the internal hardened layer has a strength far in excess of the strength of the remaining metal and is at the same time under compression, an internal load placed upon the tubular structure will first tend to reduce the compressive strength of the hardened layer and at the same time increase the stress of the portion under tension and carry the same to a higher tension stress. It will also appear that the tension stress of the outer layers will be raised to the yield point before the compressive stress of the internal layer is neutralized and changed to a tension stress. If the inner layer under no circumstances ever carries a tensile stress, it lacks any usefulness in withstanding internal loading.

Since the unit yield strength of the hardened layer under such circumstances is many times the yield strength of the unhardened portion of the tubular structure, the internal layer in order to produce a structure in which the greatest strength against internal loading is present should be initially under tension and the remaining metal initially under compression when not internally loaded. Referring to the drawing, there is illustrated a section through the tubular structure 10 in which an internal layer 12 has been hardened to a depth of approximately a tenth of an inch and in which the outer layer 14 remains in its original unhardened state. The relative thickness of the hardened layer to the unhardened layers may be in the ratio of one to two, and in such a structure initially the internal hardened layer resulting from the electro-magnetic induction heat treatment will be found to be under a residual or trapped compressive stress.

In order to reverse the trapped or residual stresses and place the hardened layer under initial tension and the outer layers under initial compression which is an object of the present invention, the internal layer may be heated substantially instantaneously to cause expansion thereof and because of the superior strength thereof, will thereupon cause the outer layers to be stressed beyond their yield point and thus be upset so that upon cooling of the tubular structure to a uniform temperature throughout, the expanded outer layers will become placed under compression and the internal hardened layer be placed under tension. In accordance with the invention, an electro-magnetic induction heating coil, such as illustrated at 16, may be passed through the length of the tubular structure so as to heat the inner layer to the desired degree. Preferably the coil 16 will be connected to a high frequency high power source of alternating current and will have threaded through the center thereof an iron core 18 in order to assist in the concentration of energy at a high rate in the layer in which the heat is to be generated. The construction of the coil may be substantially in accordance with that disclosed in the application Serial No. 164,320 hereinabove referred to.

By substantially instantaneously raising the temperature of the internally hardened layer of the tubular structure to the desired temperature for example such as 400° F. and applying the heat to the layer almost instantaneously and before any consequential heat may escape therefrom to the outer layers, the inner layer which was initially under compression is forced to expand because of the increase in compression due to thermal expansion resulting from the heat generated and consequent temperature rise in the internal layer. The additional compressive stress developed in the internally hardened layer through the heating thereof will be sufficient to stress the outer unhardened and cold layers beyond their elastic limit so that they will take a permanent set.

In practice, tubular structures treated in the manner set forth will be found to have had their actual internal diameter enlarged slightly through the treatment, and this because the external layers have been given a permanent set and stressed beyond their yield point allowing the internal layer, formerly under compression, to expand. No quenching need be resorted to for the structural change in the tubular object takes place immediately upon the development of heat and the raising of the compressive stresses in the internal layer sufficiently to force the outer layers to yield, and the structure can thereafter be permitted to cool in air or if desired for rapidity, the same may be cooled by placing in a cooling medium or cooling bath or even by quenching internally alone as described in the afore-mentioned application. The structural change may be effected progressively throughout the length of a long tubular object whose internal layer has been previously hardened or if desired, by the use of a coil of sufficient length, the entire object may have the structural changes in the stresses effected simultaneously. While a repetition of the upsetting operation employing the same heating would seem from the foregoing to effect no change over and above the change effected by the first heating, it has been found that repetition even with the same heat and same conditions, except that the piece has already undergone physical upset from the first heat, may and does effect a reorganization of the stressed portion in the transition zone between the hardened and unhardened zones and beneficially effects the tubular structure.

It will appear that the heating of the internal layer to a temperature of for example 400° F. may not effect any adverse material change in its hardness and yet the treatment hereinabove described will materially increase the internal load strength of the tube. In some instances it may be desirable to carry the temperature created in the internal layer to a point such as produces a certain amount of drawing of the original hardness in the internal layer, in which case the internal layer may be initially hardened to a much higher degree than that finally desired so that the drawing action will produce an amount of reduction in the hardness of the internal layer such as will produce the hardness desired.

In some instances it is often desirable to reduce the extreme hardness of such an internal layer somewhat in order to produce a better physical condition and in such cases the procedure above-referred to not only results in an improved strength against internal loading but does not materially impair the wear or corrosion resistant surface.

While a temperature of 400° F. has been suggested, the internal layer obviously may be heated to any temperature below the critical hardening temperature. The temperature chosen, of course, will be that which is necessary to produce the desired or necessary upset in the outer layers. In some instances the temperature so chosen will be limited due to a desire to refrain from drawing the hardness of the hardened layer. In such cases, the temperature differential may be increased by refrigerating the work before heating the internal layer. The entire structure may have its physical characteristics further improved by subjecting it to a low temperature which may be for example 250° F. for a suitable time such as several hours.

The ratio of the thickness of the hardened layer to that of the unhardened layer in the example given has been substantially one to two and it will readily appear that, for example, in a three inch tube, if the yield strength of the hardened layer is over two times that of the unhardened layer, the hardened layer when heated and caused to expand will have the necessary strength to stretch the unhardened layer beyond the elastic limit. The thickness of the unhardened layer must be such that the total strength of the hardened layer at the temperature to which it is to be raised is sufficient to overcome the yield strength of the unhardened layer, without the hardened layer reaching its elastic limit. Thus with a hardness ratio of one to five and a thin walled cylinder having a sufficient radius so that complications resulting from short radius and thick walls are substantially eliminated, it will appear that the hardened layer should have a thickness of and above one-fifth of the thickness of the unhardened layer. Sufficient margin of safety must be left between these values so that in general practice a ratio of two or three to one will usually be found to be satisfactory although a ratio as high as four to one may be employed.

While the invention has been described in conjunction with increasing the internal loading strength of tubular structures, it will, of course, appear obvious that the axial tensile strength of such a tubular object will be materially increased by such treatment. For example, the compressive stress of the internal layer prior to treatment exerts itself not only circumferentially but elementally of the tubular object and consequently, when a tubular structure of this kind is placed under axial tension, the outer unhardened layers being already under considerable tension in opposition to the compressive stress of the internal layer would be prevented from resisting such axial tension stress by the amount of its residual or trapped tension stress. By placing the outer layers under compression initially and the internal layers under tension, the internal layers and external layers may, when placed under tension, combine and assist one another in resisting such a tension stress and thus the axial tension strength of such a tubular structure is increased.

It will thus appear that the invention may be applied to flat plates having hardened surface layers as well as tubular structures, and segments of tubular structures, it being desirable that such hardened layers be given an initial trapped tension stress so that the ultimate strength of the combined hardened and unhardened layers of the plate may be increased. Where a tube is employed however, the important advantage exists in that the tube resists distortion due to the stresses, whereas a strip or segmental segment would tend to bow when not loaded.

While one method has been disclosed for effecting the stresses described, and which mode is believed to be superior to any other method which might be employed for the purpose, it is to be understood that under some circumstances the internal layer may be heated by flame heating or the internal layer may be expanded through the use of high internal pressures. The use of such flame heating, however, has the disadvantage that the heat must be conducted from the surface into the structure instead of being inducted within the structure. The speed of heating is thus reduced and control is made more difficult. With regard to the application of pressure to expand the internal layer and carry the external layers beyond the yield point, the danger exists that the internal layer may itself be carried beyond the tension yield point and be ruptured if care is not exercised. With electromagnetic induction heating it will appear that the internal layer is in effect temporarily increased in its natural length and thus such danger does not exist and the stress is always compressive until the operation is completed.

While it is contemplated that through the treatment of the present invention the internal layer shall actually be placed under tension, it will appear obvious that any reduction in a residual compressive stress actually present in the internal layer would improve the strength of the tube against internal loading, this being true wherever the internal layer has a yield strength greater than the external layers and especially so when the ratio of these yield strengths is in the order of three, four or five to one.

The tension and compressive stresses produced by this method may be limited to axial or to circumferential stresses if desired by merely constraining the piece mechanically during the process; for example if it is desired to rearrange the axial stresses only, the piece may be constrained by placing the same within a rigid shell with the proper diameter to retain the tube against expansion radially. In order to restrict the stresses to circumferential stresses the axial length of the tube may be rigidly constrained during the process. Also by mechanically constraining the piece either circumferentially or axially beyond a set limit, the circumference or tension stresses may be completely eliminated while at the same time the tension and compressive stresses are rearranged as described to increase the axial strength or internal load strength, respectively.

Although the invention has been illustrated and described in general in connection with a specific embodiment, it is to be understood that the same is not limited thereto but may be practiced in various modified forms and ways. As many changes in the procedure and in the structure evolved therefrom may be made without departing from the spirit of the invention as will be apparent to those skilled in the art, reference will be had to the appended claims for a definition of the limits of the invention.

What is claimed is:

1. The method of enhancing the strength of a metallic tubular object which comprises first differentially heating and quenching the object to provide an annular internal hardened zone under residual compression stress and an external materially less hard zone under residual tension stress with a ratio of thicknesses respectively of said internal and external zones which is greater than the ratio of the yield strengths respectively of said external and internal zones, then tensile stressing the metal of the external zone beyond its elastic limit to give permanent set thereto by expanding the metal of the internal zone through momentary heating at a temperature less than momentary drawing temperature and with such rapidity as to preclude the transfer of heat from the internal to the external zone prior to stressing the external zone beyond its elastic limit, and finally cooling the object, whereby upon contraction of the internal zone the external and internal zones will be placed under compression and tension stresses respectively.

2. The method of enhancing the strength of a tubular metallic object which comprises differentially heating and quenching the object to provide an internal hardened zone under residual compression stress and an external materially less hard zone under residual tension stress, and then simultaneously expanding and tension stressing the external zone beyond its elastic limit to give it a permanent set by momentarily thermally expanding the internal zone, the ratio of the thickness of the internal zone to the thickness of the external zone being greater than the ratio of the yield strength of the external zone to the yield strength of the internal zone at the expanding temperature, whereby upon cooling of the internal zone the external zone will be placed under compression stress and the internal zone will be placed under tension stress.

3. The method of enhancing the strength of a tubular metallic object which comprises differentially heating and quenching the object to provide an internal hardened zone under residual compression stress and an external materially less hard zone under residual tension stress, and then simultaneously expanding and tension stressing the external zone beyond its elastic limit to give it a permanent set by momentarily thermally expanding the internal zone with such rapidity as to substantially prevent the transfer of heat from the internal zone to the external zone prior to the stressing of the external zone beyond its elastic limit, the ratio of the thickness of the internal zone to the thickness of the external zone being greater than the ratio of the yield strength of the external zone to the yield strength of the internal zone at the expanding temperature, whereby upon cooling of the internal zone the external zone will be placed under compression stress and the internal zone will be placed under tension stress.

4. The method of enhancing the strength of a metallic tubular workpiece which comprises differentially heating and quenching the workpiece to provide a hardened internal surface layer of metal of uniform thickness under residual compressive stress and a materially less hardened remainder layer of metal, and in which the ratio of the thicknesses respectively of said hardened and less hardened layers is greater than the ratio of the yield strengths respectively of said less hardened and hardened layers of metal, and then expanding the hardened layer of metal an amount sufficient to stress the less hardened layer beyond its elastic limit to give it a permanent set while retaining the internal layer in such condition that upon termination of the expansion thereof it will contract and place said less hardened layer under compression stress and said hardened layer under tension stress.

HOWARD E. SOMES.